United States Patent Office 3,162,784
Patented Dec. 22, 1964

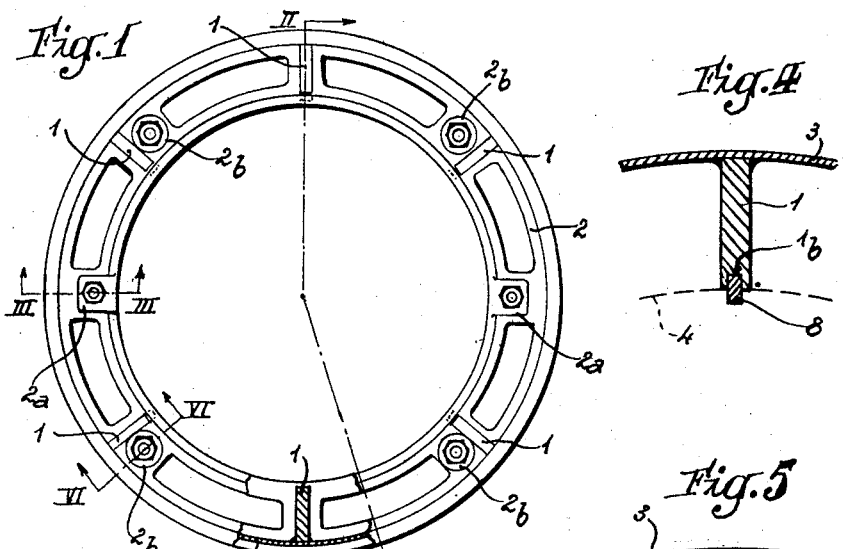

3,162,784
ROTARY ELECTRIC MACHINES
René Georges Charlin, 20 Blvd. des Tchecoslovaques,
Lyon, France
Filed Apr. 17, 1961, Ser. No. 103,463
4 Claims. (Cl. 310—258)

This invention relates to rotary electric machines such as rotary converter units used for electric welding. Such units generally comprise an induction motor and a generator which may be a direct current dynamo or a single-phase alternator with excitation by direct current or by alternating current.

Such units often comprise a single stator frame in which both elementary machines are mounted, the said frame enclosing the individual stators and the bearings of the common shaft on which both rotors are mounted. This frame is generally in the form of a casting or alternatively it may be formed as a tubular sheet-iron member with cast metal end covers. This frame is first machined internally or bored so as to receive the stators generally of laminated form. The inner bore of the stators is slightly machined or rectified and the end circular recesses adapted to receive the end covers are in turn machined co-axially with respect to the bore of the stators.

In another method the stator frame is made of light alloy cast on the laminations of the stators. Here again the bores of the stators have first to be machined and the ends of the frame are thereafter machined co-axially with respect to the said bores.

In both cases the operations required are expensive and further the statoric windings have to be mounted in the stators after the latter have been disposed in the stator frame.

The same problems arise in the construction of other rotary electric machines such as motors or generators.

The present invention has for its object to avoid the above-mentioned difficulties.

In accordance with this invention a stator frame for a rotary electric machine, such as a rotary converter, comprises a cylindrical cage formed by longitudinal bars and by cast annular members in which the ends of the bars are embedded, and a tubular sheet-iron sleeve disposed on the bars, the end faces of the annular members and the inner edges of the bars being machined co-axially respectively to receive the bearing supporting covers of the machine and the stator or stators thereof.

The sheet-iron sleeve is preferably welded to the bars so as to form with the cage a rigid unit. The ends of the bars embedded in the annular members are conveniently notched.

Preferably the stator or stators of the machine is or are axially maintained against an inwardly directed shoulder of the inner edge of the bars.

The stator or stators may be retained about the longitudinal axis of the frame by an inwardly projecting key carried by one of the bars of the cage. The key may be in the form of a small plate welded on one side of the bars.

The stator or each stator of the machine is conveniently maintained against the above mentioned shoulder of the inner edge of the bars by longitudinal retaining fingers secured to one of the annular members of the frame. Each retaining finger may have a bent outer end which is secured by a screw in a recess of the corresponding annular member.

Each annular member may have a cylindrical outer portion adapted to receive a cylindrical protecting cap.

In a stator frame for a rotary converter the bars may have a central portion in which their inner edge is at a somewhat smaller radial distance from the axis of the frame, the said portion being delimited by two shoulders, in such a manner that the cage may receive two individual stators maintained at a distance from each other by the said shoulders.

In the annexed drawings:

FIG. 1 is an end view with parts in section showing a stator frame for a rotary converter according to this invention.

FIG. 2 is a fragmental longitudinal section taken along line II—II of FIG. 1.

FIG. 3 is an enlarged longitudinal section taken along line III—III of FIG. 1.

FIG. 4 is an enlarged cross-section taken along line IV—IV of FIG. 2.

FIG. 5 is a view similar to FIG. 4, but illustrating a modified construction.

FIG. 6 is an enlarged longitudinal section taken along line VI—VI of FIG. 1.

The stator frame illustrated comprises six bars 1 co-axially arranged about the general axis of the frame with the longer axis of their rectangular cross-section disposed radially, in such a manner as to form a cylindrical cage, the notched ends of these bars being embedded in cast annular members 2 made of an appropriate metal, such as an aluminum alloy. The cage thus formed is enclosed in a sheet-iron sleeve 3 to which the bars are welded, as clearly shown in FIG. 3 for the upper bar 1. In the example illustrated the bars are not regularly spaced on the periphery of the cage, but this is without any importance for the invention.

It will be understood that the inner edges of the bars are disposed on a cylindrical geometrical surface. The diameter of this surface is such that the laminations 4 of each individual stator may be slidably engaged without any noticeable radial clearance into the ends of the cage formed by the bars. There is besides provided on the inner edge of each bar a shoulder 1a (FIG. 2) which forms an axial abutment for the laminations, or in other words the cage formed by bars 1 has a central portion of somewhat smaller diameter and two lateral portions adapted to receive the individual laminated stators of the converter unit. Each stator is retained in position against the corresponding shoulders 1a by any appropriate means, but preferably by longitudinal fingers 5, as indicated in dash lines in FIG. 3, the outer ends of each finger 5 being bent at 90° and secured to the adjacent annular member 2. Each annular member 2 is formed for this purpose with two diametrically opposed recesses 2a (FIGS. 1 and 3) which open outwardly in the axial direction and inwardly in the radial direction. The transverse wall which forms the bottom of each recess 2a in the axial direction includes a hard metal core 6 embedded in the light metal of the end member, the said core having a screw-threaded hole in which is screwed a screw 7 which clamps the bent end of the finger 5 under consideration. With such an arrangement the individual stators of the converter unit are axially retained against the shoulders 1a of the bars and at the proper distance from each other.

In order to retain the individual stators against rotation about the axis of the frame, the upper bar 1 has a longitudinal groove 1b (FIG. 4) extending on its inner edge, this groove receiving a retaining key 8 the projecting portion of which engages a notch provided on the periphery of the statoric laminations in a per se well known manner. Alternatively the retaining key may be in the form of a small plate 9 (FIG. 5) welded against one side of a bar 1 with the edge of the small plate projecting somewhat towards the axis of the frame beyond the inner edge of the bar.

Each annular member is besides arranged for receiving an end cover on which are mounted the bearings adapted to support the converter shaft. For this purpose the outer transverse face of each member 2 is formed with four bosses 2b (FIGS. 1 and 6) each having an inner hard metal core 10 provided with an axially directed blind screw-threaded hole. The corresponding end cover, indicated in dash lines at 11 in FIG. 6, is centered in the member 2 under consideration and it is clamped against the bosses 2b thereof by means of screws such as 12 screwed into the cores 10.

The annular members 2 further support two end caps adapted to close the ends of the converter. Each cap is made for instance of sheet-iron and its cylindrical open end is engaged on the cylindrical periphery of an annular member 2, as indicated in dash lines at 13 in FIG. 3, until it abuts against a peripheral rib 2c of member 2. The arcuate wall which forms the bottom of each recess 2a in the radial direction has an inner hard metal core 14 embedded therein, such core being tapped for receiving a radial screw 15 adapted to secure the corresponding end cap 13 in position.

The above-described stator frame is preferably established as follows:

The bars 1 are first disposed on an appropriate fitting which retains them at the proper position with respect to each other. Their ends are engaged into a mould in which the cores 6, 10 and 14 have already been disposed and each annular member 2 is thus realized by casting an aluminium alloy in the mould.

The outer sleeve which has been previously prepared with the adjacent edges of the sheet-iron not yet welded to each other, is then engaged on the bars and secured thereto by welding, the slit of the sleeve being at the same time closed by a weld line.

The frame thus obtained is then mounted on a boring machine whereon the inner edges of the bars and the outer faces of the annular members are machined.

The individual stators have been previously prepared with their electric windings. They are engaged into the ends of the frame and pushed axially against the inner shoulders 1a. They are thereafter secured in position by means of the retaining fingers 5.

The stator frame is then ready to receive the converter shaft with the individual rotors mounted thereon, the end covers which support the said shaft, and the end caps which close the ends of the said frame.

It will be appreciated that the sheet-iron sleeve may be provided with any kind of outer member which may be conveniently secured thereto by welding, such as for instance a wheeled base forming a support for the converter, a terminal box, &c.

I claim:

1. A stator frame for a rotary electric machine having at least one rotor, comprising a stator formed of a stack of laminae; a plurality of longitudinal bars disposed about a common axis in parallel relation thereto to form a substantially cylindrical cage-like assembly, each of said bars having an inner side and an outer side and a first and a second end, the first ends of said bars forming a first end for said cage-like assembly and the second end of said bars forming a second end for said assembly, and the inner side of said bars comprising a portion adjacent to the first end of said assembly and situated at a distance from said common axis equal to the outer radius of said stator in order that same may be slidably received through the first end of said assembly; first and second annular end members made of cast metal in which the first and second ends of said bars are respectively embedded, the inner diameter of said first annular end member being at least equal to the outer diameter of said stator to permit passage thereof; an outer sheet-iron sleeve disposed on the outer sides of said bars and welded thereto to form therewith and with said first and second annular end members a substantially rigid tubular unit enclosing said stator; means to prevent said stator from rotating within said tubular unit; and means to removably retain said stator longitudinally within said tubular unit.

2. In a stator frame as claimed in claim 1, the inner side of each of said bars being formed with an inwardly projecting shoulder at the end of the first portion of said inner side farthest from the first end of said cage-like assembly, and said means to longitudinally retain said stator comprising fingers removably secured to said first annular end member and extending longitudinally within said tubular unit to maintain said stator against the shoulders of the inner sides of said bars.

3. A stator frame for a rotary electric machine having two rotors mounted on a common shaft, comprising a first and a second cylindrical stator each formed of a stack of laminae; a plurality of longitudinal bars disposed about a common axis in parallel relation thereto to form a substantially cylindrical cage-like assembly, each of said bars having an inner side and an outer side, and a first and a second end, the first ends of said bars forming a first end for said cage-like assembly and the second end of said bars forming a second end for said assembly, and the inner side of said bars comprising a first portion adjacent to the first end of said assembly and situated at a distance from said common axis equal to the outer radius of said first stator in order that same may be slidably received through the first end of said assembly, a second portion adjacent to the second end of said assembly and situated at a distance from said common axis equal to the outer radius of said second stator in order that same may be received through the second end of said assembly, and an intermediate portion situated between said first and second portion and situated at a distance from said common axis lower than the outer radius of said first and second stator to form a shoulder to retain said stators longitudinally of said assembly; a first and second annular end member made of cast metal in which the first and second ends of said bars are respectively embedded, the inner diameter of said first annular end member being at least equal to the outer diameter of said first stator to permit passage thereof and the inner diameter of said second end member being at least equal to the outer diameter of said second end member to permit passage thereof; an outer sheet-iron sleeve disposed on the outer sides of said bars and welded thereto to form therewith and with said first and second annular end members a substantially rigid tubular unit enclosing said first and second stators; means to prevent said first and second stators from rotating within said tubular unit; and means to removably maintain said first and second stators against the shoulders formed by the intermediate portions of the inner sides of said bars.

4. In a stator frame as claimed in claim 3, said means to maintain said first and second stators against the shoulders formed by the intermediate portions of the inner sides of said bars comprising fingers removably secured to said first and second annular members and extending longitudinally within said tubular unit to engage said first and second stators.

References Cited by the Examiner
UNITED STATES PATENTS

| | | | |
|---|---|---|---|
| 1,898,489 | 2/33 | Kieffer | 310—258 |
| 2,818,515 | 12/57 | Dolenc | 310—258 X |

MILTON O. HIRSHFIELD, *Primary Examiner.*

DAVID X. SLINEY, *Examiner.*